United States Patent
Jong et al.

(10) Patent No.: US 8,888,944 B2
(45) Date of Patent: Nov. 18, 2014

(54) AFFINITY BOND LAYER

(76) Inventors: Erik G. De Jong, San Francisco, CA (US); Michael K. Pilliod, San Francisco, CA (US); Chuan Keat Low, Shenzhen (CN); James R. Krogdahl, Cupertino, CA (US); Rimple Bhatia, Woodside, CA (US); Justin T. Sawyer, Santa Clara, CA (US); Michael B. Wittenberg, Sunnyvale, CA (US)

( * ) Notice: Subject to any disclaimer, the term of this patent is extended or adjusted under 35 U.S.C. 154(b) by 95 days.

(21) Appl. No.: 13/607,576

(22) Filed: Sep. 7, 2012

(65) Prior Publication Data
US 2014/0071597 A1 Mar. 13, 2014

(51) Int. Cl.
*B29C 65/48* (2006.01)
*B32B 7/04* (2006.01)
*B32B 37/26* (2006.01)
*B32B 38/14* (2006.01)
*C09J 5/02* (2006.01)
*C08J 5/18* (2006.01)

(52) U.S. Cl.
USPC ........... 156/277; 156/299; 156/300; 156/305; 156/307.3; 156/307.7; 156/210

(58) Field of Classification Search
USPC ................ 156/247, 277, 297, 299, 300, 305, 156/307.1, 307.3, 307.7, 310
See application file for complete search history.

(56) References Cited

U.S. PATENT DOCUMENTS

| 4,522,870 | A | 6/1985 | Esmay |
| 5,707,713 | A | 1/1998 | Langan et al. |
| 7,439,160 | B2 | 10/2008 | Le Vaillant et al. |
| 2010/0155288 | A1* | 6/2010 | Harper et al. ................. 206/531 |
| 2010/0314040 | A1 | 12/2010 | Tyler, II et al. |
| 2011/0104426 | A1 | 5/2011 | Farooq et al. |
| 2012/0034437 | A1 | 2/2012 | Puligadda et al. |

FOREIGN PATENT DOCUMENTS

JP 10060349 A * 3/1998 ............... B41M 1/28

OTHER PUBLICATIONS

English Abstract of JP 10-60349 (Mar. 26, 2014).*
Machine English Translation of JP 10-60349 (Mar. 27, 2014).*

* cited by examiner

*Primary Examiner* — Sing P Chan
(74) *Attorney, Agent, or Firm* — Womble Carlyle Sandridge & Rice LLP

(57) ABSTRACT

A method and apparatus for bonding a first substrate to a second substrate can include an intermediate layer disposed between the substrates. In one embodiment, the intermediate layer can be disposed to a bonding area of the first substrate and only one adhesive layer can be disposed between the intermediate layer and the second substrate. In other embodiments, a plurality of intermediate layers can be used.

20 Claims, 4 Drawing Sheets

AFFINITY BOND LAYER

FIELD OF THE DESCRIBED EMBODIMENTS

The described embodiments relate generally to bonding substrates together and more particularly to forming a bond between two substrates indirectly through one or more intermediate layers

BACKGROUND

The bond strength of a bond between a first substrate and a second substrate bonded through an adhesive can be affected by many factors. First of all the affinity of the first substrate and the second substrate to a selected adhesive can affect the wetting of the bond area and thereby affect the resulting bond strength. Another factor can be the mechanical properties of the selected adhesive, such as an ultimate bond strength and sensitivity to strain rate. A third factor for bond strength can be in regards to mechanical properties of the bond interface area. For example, an ultimate strength of the substrate material and sensitivity to strain rate of substrate material in the bond area can be an important factor for bond strength.

In some cases, a product design may not have enough degrees of freedom to allow the designer enough choices to formulate a relatively strong bond between substrates. For example, a selected substrate may have a poor bonding characteristics with a particular adhesive. However, the may be no design flexibility in the choice of substrate material and, furthermore, the choices for an adhesive may be limited because required operating conditions, required tack or other adhesive working characteristics.

Therefore, what is desired is a way to bond substrates together that can produce relatively strong bonds while maintaining substrate choices.

SUMMARY OF THE DESCRIBED EMBODIMENTS

This paper describes various embodiments that relate to bonding a first substrate to a second substrate by introducing at least one intermediate layer between the first substrate and the second substrate.

One method for forming a bond between a first substrate to a second substrate can include the steps of bonding a first intermediate layer to a first surface of the first substrate, applying one adhesive layer to a first surface of the second substrate and then bonding the first substrate to the second substrate.

In another embodiment, a method for forming a bond between a first substrate and a second substrate can include the steps of binding a first intermediate layer to a first surface of the first substrate, bonding a second intermediate layer to the second substrate, bonding a third intermediate layer to the second intermediate layer and applying one adhesive layer to the third intermediate layer and bonding the first substrate to the second substrate by placing the adhesive on the third intermediate layer in direct contact with the first intermediate layer.

A housing for a portable electronic device can include a rear cover with at least one opening and a bonding surface near the opening, where the rear cover can be configured to contain electrical components related to the portable electronic device. The housing can also include a clear front cover, sized to fit within the opening in the rear cover and also including a bonding surface matching the bonding surface on the rear cover. The housing can also include a first intermediate layer bonded to the front cover, a display unit within the rear cover and positioned such that at least a portion of the display can be visible through the front cover and an adhesive applied only on the first bonding surface of the rear cover, where the adhesive is configure to bond the rear cover to the front cover through the intermediate layer.

A bonded assembly can include a first substrate with a bonding region, a second substrate with a bonding region substantially matching the bonding region of the first substrate, a first intermediate layer bonded to the bonding region of the first substrate and only one adhesive layer disposed over the bonding region of the second substrate and placed in direct contract with the first intermediate layer.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Often a bond between a first substrate and a second substrate can have a limited bond strength. The bond strength can be limited because of substrate choice and/or because of adhesive bonding characteristics between a selected adhesive and the first and/or the second substrate. For example an affinity between the adhesive and the first surface can be relatively poor, reducing a bond strength between the first and the second substrates. In some designs, there may be little flexibility in adhesive choice because of operating conditions or assembly limitations, for example.

In one embodiment an intermediate affinity layer can be disposed between the first substrate and the adhesive by bonding the affinity layer to the first substrate. Bond strength characteristics can be improved when bond strengths between the adhesive to the intermediate layer and the intermediate affinity layer to the first substrate are relatively greater than a bond strength between only the adhesive and the first substrate. In other embodiment, multiple intermediate affinity layers can be used to improve bond strength. For example a first intermediate affinity layer can be disposed on a first substrate while a second affinity layer can be disposed on the second substrate. An adhesive can be disposed between the first and the second intermediate affinity layers. An overall bond strength in this case can be a function of the bond strength between the adhesive and the first affinity layer and the bond strength between the adhesive and the second affinity layer.

Figure 1:
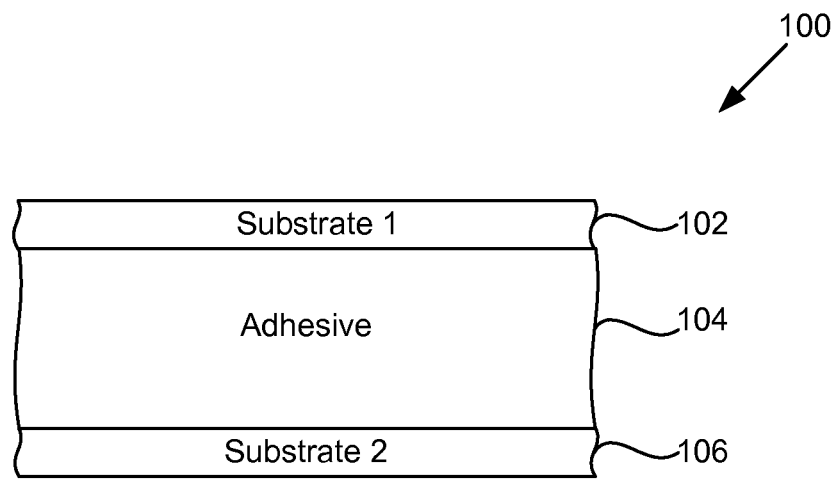
FIG. 1 is a cross section of a prior art bond formed between a first substrate and a second substrate.

FIG. 1 is a cross section of a prior art bond 100 formed between a first substrate 102 and a second substrate 106 with an adhesive 104. The first and the second substrates 102, 106 can be formed from any appropriate material. For example, the substrates 102, 106 can be polymers such as filled and un-filled resins, metallic substrates such as aluminum, titanium, metal alloys, formed metal such as formed sheet metal, or other materials such as wood or glass. An adhesive 104 can be disposed between the first substrate 102 and the second substrate 106 to bond the substrates (102, 106) together. Adhesive 104 can be pressure sensitive, thermo or UV curing or any other technically feasible adhesive. In some designs, however adhesive choices may be limited due to manufacturing constraints (limitations on the manufacturing line) or operating constraints (such as operating temperature extremes or required operating humidity). As a result, a bond may be limited in strength especially when the adhesive 104, although selected for certain characteristics such as operating temperature, can have a relatively poor bond strength with either the first substrate 102 or the second substrate 106 or, in some cases, poor bond strength with both substrates.

Figure 2:
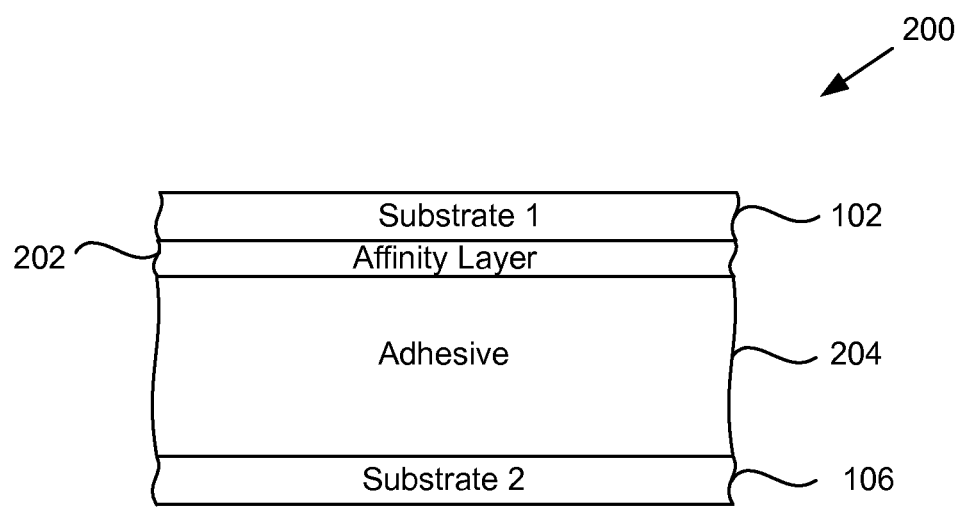
FIG. 2 is a cross section illustration of a bond between the first substrate and the second substrate formed with an intermediate affinity layer.

FIG. 2 is a cross section illustration of a bond 200 between the first substrate 102 and the second substrate 106 formed with an intermediate affinity layer 202 and an adhesive 204 in accordance with one embodiment described in the specification. The first substrate 102 and the second substrate 106 can be substrates as described above in FIG. 1. In one embodiment, the intermediate affinity layer 202 can be disposed on one surface of the first substrate 102. The intermediate affinity layer 202 can be formed from a material that can bond relatively well to both the adhesive 204 and to the first substrate 102. In one embodiment, the intermediate affinity layer 202 can be aluminum or have aluminum content. For example, if the first substrate 102 is glass and the second substrate 106 is aluminum, the intermediate affinity layer 202 can also be aluminum. In this example, the adhesive 204 can be selected to have relatively good bond strength with aluminum in order to form a bond with relatively good bond strength. Without the intermediate affinity layer 202, the selected adhesive 204 may need to bond with both the first substrate 102 of glass and a second substrate 104 of aluminum. In some embodiments selecting an adhesive 204 to include relatively high bond strength with a single material can be easier than selecting an adhesive 204 with relatively high bond strengths with two materials (both first and second substrates 102, 106 respectively).

In one embodiment, intermediate affinity layer 202 can be bonded to first substrate 102 with a variety of technically feasible methods. For example, intermediate affinity layer 202 can be printed onto the first substrate 102. In other embodiment, intermediate affinity layer 202 can formed by mixing a particulate with a liquid carrier, for example aluminum particles mixed with an ink and disposed onto one surface of the first substrate 102.

In one embodiment, the overall bond strength of bond 200 can be greater than prior art bond 100. Bond strength of bond 200 can be greater than prior art bond 100 when a bond strength between adhesive 204 and intermediate affinity layer 202 is relatively greater than a bond strength between adhesive 204 and first substrate 102. When a bond strength between intermediate affinity layer 202 and first substrate 102 is as strong or stronger than the bond strength between adhesive 204 and intermediate affinity layer 202, then an overall bond strength of bond 200 can be relatively greater than the bond strength of prior art bond 100.

The addition of the intermediate affinity layer 202 can provide more adhesive choices to a designer. The bond performance, in this example, is no longer limited to the bond strength between the adhesive 204 and the first substrate 102, but can also be determined by the interaction between adhesive 204 and intermediate affinity layer 202.

Figure 3:
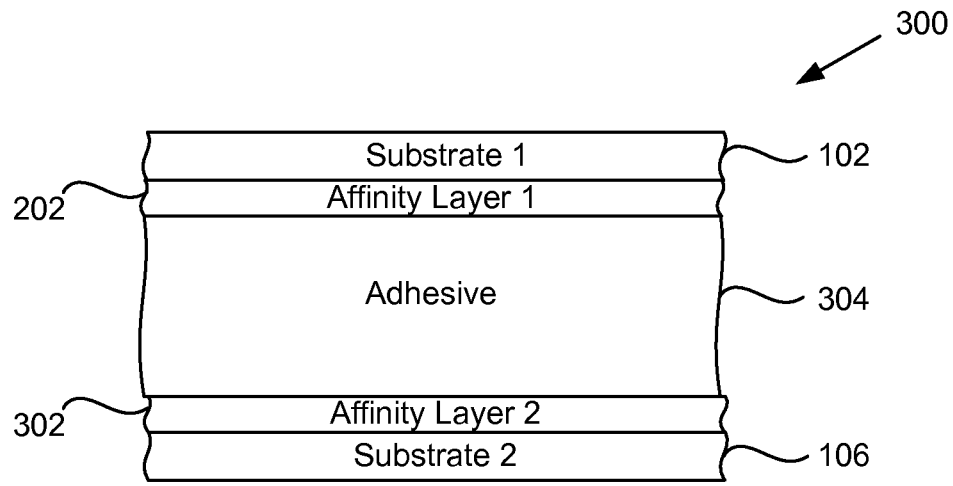
FIG. 3 is a cross section illustration of a bond between the first substrate and the second substrate formed with a plurality of intermediate affinity layers.

FIG. 3 is a cross section illustration of a bond 300 between the first substrate 102 and the second substrate 106 formed with a plurality of intermediate affinity layers 202, 302 and an adhesive 304 in accordance with one embodiment described in the specification. In this embodiment, a first intermediate affinity layer 202 can be as described above in FIG. 2. A second intermediate affinity layer 302 can be disposed between adhesive 304 and the second substrate 106. Introducing the second intermediate affinity layer 302 can provide an additional degree of freedom for controlling bond strength. The material selection guidelines for this the second intermediate affinity layer 302 can be similar to those described for the intermediate affinity layer described in FIG. 2. In one embodiment the first intermediate affinity layer 202 and the second intermediate affinity layer 302 can be formed from similar materials. In another embodiment, the first intermediate affinity layer 202 and the second intermediate affinity layer 302 can be formed from dissimilar materials.

The configuration of bond 300 can be advantageous when available adhesives (or adhesive with desirable characteristics) may not have good intrinsic bond strengths with either the first substrate 102 or the second substrate 106. Good bond strength can be achieved by bonding the first and second intermediate affinity layers (202, 302) to the first and second substrates 102, 106 and selecting the intermediate affinity layers to have good bond strengths with adhesive 304.

Figure 4:
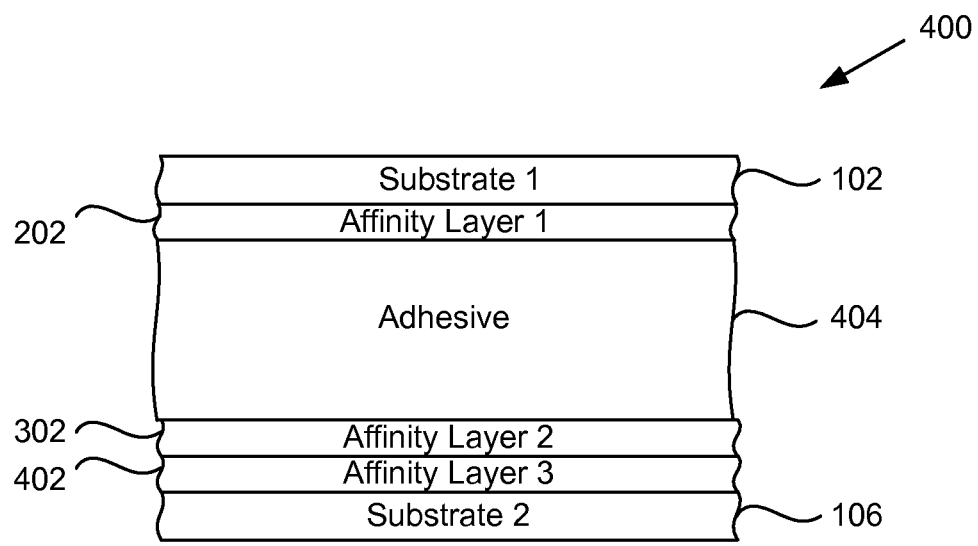
FIG. 4 is a cross section illustration of a bond between the first substrate and the second substrate formed with a plurality of intermediate affinity layers.

FIG. 4 is a cross section illustration of a bond 400 between the first substrate 102 and the second substrate 106 formed with a plurality of intermediate affinity layers 202, 302, 402 and an adhesive 404 in accordance with one embodiment described in the specification. Intermediate affinity layers can be bonded to other intermediate affinity layers to achieve any desired bond strength. For example second intermediate affinity layer 302 can be selected because of good bond characteristics between the second intermediate affinity layer 302 and adhesive 404 and third intermediate affinity layer 402 can be selected because of a good bond characteristic between third intermediate affinity layer 402 and the second substrate 106. In other embodiments, multiple intermediate affinity layers can be disposed next to both first and second substrate layers 102 and 106. In yet another embodiment, a plurality of adhesive layers can be interspersed between a plurality of intermediate affinity layers.

Figure 5:
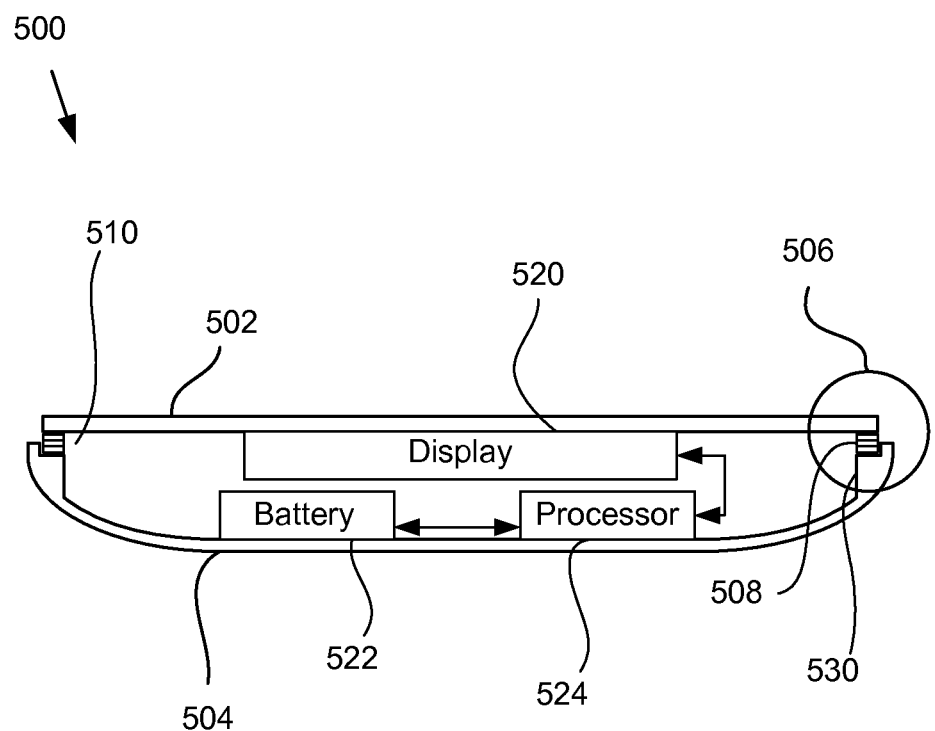
FIG. 5 is a cross sectional view of housing for a portable electronic device that can include a bond that can be formed with at least one intermediate affinity layer.

FIG. 5 is a cross sectional view of housing 500 for a portable electronic device that can include a bond that can be formed with at least one intermediate affinity layer. The housing 500 can include a front cover 502 and a rear cover 504. The housing 500 can contain components related to the portable electronic device such as a display 520, a processor 524 and a battery 522. In one embodiment, front cover 502 can be substantially transparent and allow at least a portion of the display 520 to be seen through front cover 502. The processor 524 can be configured to control the display 520 and display images on the display 520 for the user. The battery 522 can provide power for the processor 524 and the display 520.

The rear cover 504 can include at least one opening 510 that can receive the processor 524, the battery 522 and the display 520. In one embodiment, the rear cover 504 can include a mounting feature 530 that can be integral to rear cover 504, or can be formed of a material different from the rear cover 504 and secured in place with any technically feasible means such a glue, epoxy, welding or the like. The front cover 502 can be configured to substantially fit within at least one opening 510 in the rear cover 504. In one embodiment, front cover 502 can include bond areas configured to accept adhesives and/or intermediate affinity layers. At least one bond area is shown within area 506. In one embodiment, bond area 506 can include adhesives and intermediate affinity layers (shown here as 508) as were described in FIGS. 2-4.

Figure 6:
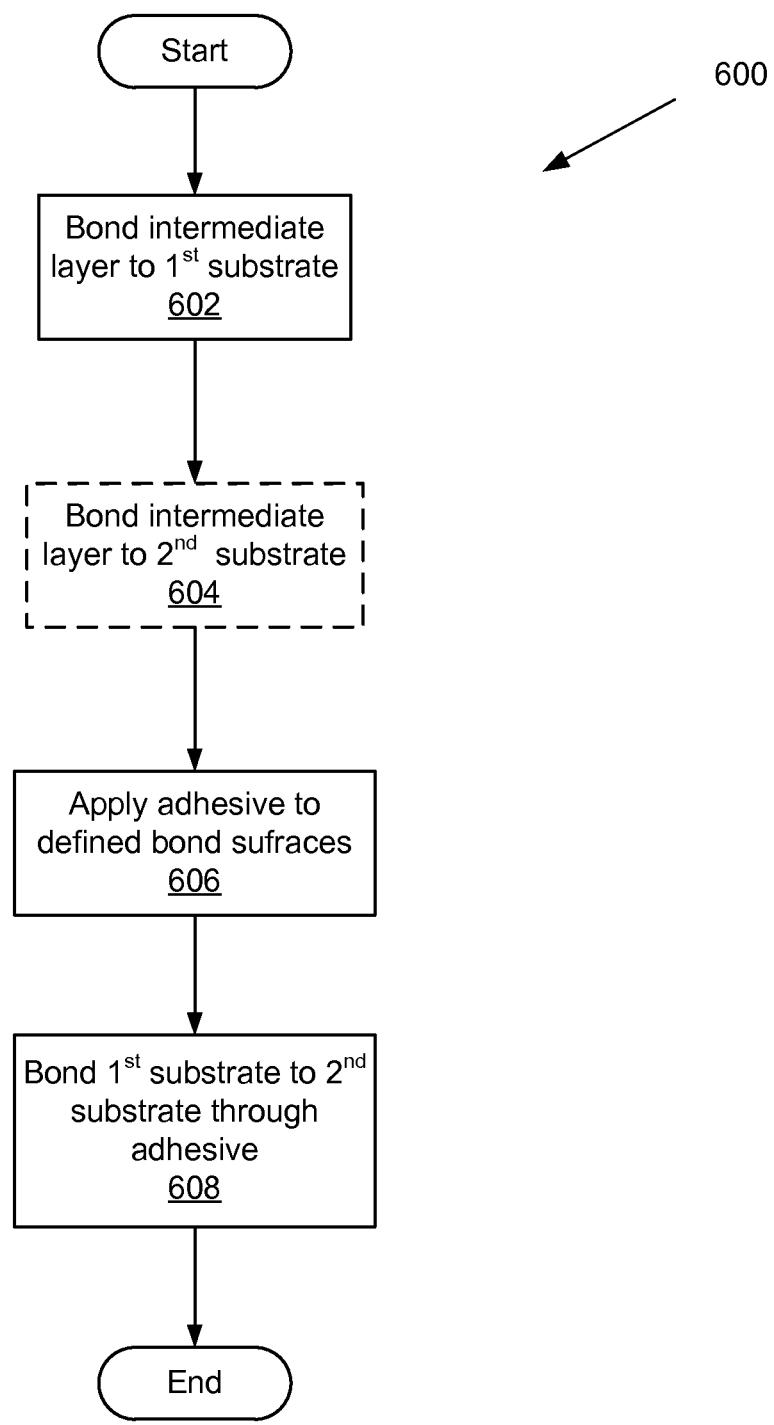
FIG. 6 is flow chart of method steps for bonding a first and a second substrate together using intermediate affinity layers within bonding areas on the substrates.

FIG. 6 is flow chart 600 of method steps for bonding a first and a second substrate together using intermediate affinity layers within bonding areas on the substrates. Persons skilled in the art will understand that any system configured to perform the method steps in any order is within the scope of this description. The method begins in step 602 when a first intermediate layer 202 is bonded to the first substrate 102. In one embodiment, the first intermediate layer 202 is only bonded to the first substrate 102 within a bond area less than an entire area of the first substrate 102. In step 604, a second intermediate layer 302 can be bonded to the second substrate 106. Step 604 can be an optional step (as shown with dashed lines). In other words, each substrate need not receive an intermediate affinity layer especially when only one intermediate affinity layer can provide a bond of sufficient strength. In step 606, an adhesive is applied to the bond area. In one embodiment, the adhesive is only applied to the bond area of one substrate (that is, either the first substrate or the second substrate, but not both). In step 608 the first substrate is bonded to the second substrate through the adhesive and the method ends. In one embodiment, the applied adhesive is placed in contact with the bond surfaces on both the first and the second substrates.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of bonding a first substrate with a second substrate, the method comprising:
    bonding an affinity layer to the first substrate such that the affinity layer has a first exposed surface, wherein the affinity layer includes particles within a carrier material;
    applying an adhesive layer to the second substrate such that the adhesive layer includes a second exposed surface, wherein the affinity layer is configured to form a stronger bond with the first substrate than the adhesive layer with the first substrate, wherein the adhesive layer is configured to form a stronger bond with the second substrate than the affinity layer with the second substrate; and
    coupling the first exposed surface with the second exposed surface such that the first substrate is bonded to the second substrate.

2. The method of claim 1, wherein the particles are comprised of aluminum.

3. The method of claim 1, wherein bonding the affinity layer comprises printing the affinity layer onto the first substrate.

4. The method of claim 1, wherein the carrier material is comprised of an ink material.

5. The method of claim 1, wherein the affinity layer is a first affinity layer, method further comprising:
    positioning a second affinity layer between the adhesive layer and the second substrate.

6. The method of claim 1, wherein the first substrate is comprised of a metal material and the second substrate is comprised of a non-metal material.

7. The method of claim 6, wherein the metal material comprises aluminum.

8. The method of claim 1, wherein the first substrate corresponds to a metal housing and the second substrate corresponds to a non-metal display cover of an electronic device.

9. A method of bonding a first substrate with a second substrate, the method comprising:
    bonding a first affinity layer to the first substrate such that the first affinity layer has a first exposed surface;
    bonding a second affinity layer to the second substrate such that the second affinity layer has a second exposed surface, wherein the first affinity layer is configured to form a stronger bond with the first substrate than the second affinity layer with the first substrate, wherein the second affinity layer is configured to form a stronger bond with the second substrate than the first affinity layer with the second substrate;

bonding a third affinity layer to the second exposed surface of the second affinity layer such that the third affinity layer has a third exposed surface, wherein the third affinity layer is configured to form a stronger bond with the second affinity layer than the first affinity layer with the second affinity layer; and coupling the first exposed surface with the third exposed surface via an adhesive such that the first substrate is bonded with the second substrate.

10. The method of claim 9, wherein coupling the first exposed surface with the third exposed surface comprises:

applying the adhesive to the third exposed surface.

11. The method of claim 10, wherein the adhesive comprises a pressure sensitive adhesive such that a coupling pressure bonds the first substrate with the second substrate.

12. The method of claim 10, wherein the adhesive comprises a thermal curing, ultraviolet (UV) light curing adhesive, or a combination thereof such that exposure to heat, UV light, or both to bond the first substrate with the second substrate.

13. The method of claim 9, wherein at least one of the first affinity layer, second affinity layer or third affinity layer include aluminum particles.

14. The method of claim 9, wherein the at least one of the first affinity layer, second affinity layer or third affinity layer include particles within a carrier material.

15. The method of claim 14, wherein the carrier material comprises an ink material.

16. A method of bonding a first substrate with a second substrate, the method comprising:

bonding a first affinity layer to the first substrate such that the first affinity layer has a first exposed surface;

bonding a second affinity layer to the second substrate such that the second affinity layer has a second exposed surface, wherein the first affinity layer is configured to form a stronger bond with the first substrate than the second affinity layer with the first substrate, wherein at least one of the first affinity layer and the second affinity layer includes particles within a carrier material; and coupling the first exposed surface with the second exposed surface such that the first substrate is bonded with the second substrate.

17. The method of claim 16, wherein the second affinity layer is configured to form a stronger bond with the second substrate than the first affinity layer with the second substrate.

18. The method of claim 16, wherein coupling the first exposed surface with the second exposed surface includes use of an adhesive.

19. The method of claim 18, wherein the adhesive is configured to form a stronger bond with the second affinity layer than the first affinity layer with the second affinity layer.

20. The method of claim 16, wherein the particles comprise aluminum and the carrier material comprises ink.

* * * * *